US008433321B2

(12) United States Patent
Martin (10) Patent No.: US 8,433,321 B2
(45) Date of Patent: Apr. 30, 2013

(54) METHOD AND APPARATUS FOR INTELLIGENTLY REPORTING NEIGHBOR INFORMATION TO FACILITATE AUTOMATIC NEIGHBOR RELATIONS

(75) Inventor: Brian Martin, Farnham (GB)

(73) Assignee: Renesas Mobile Corporation, Tokyo (JP)

( * ) Notice: Subject to any disclaimer, the term of this patent is extended or adjusted under 35 U.S.C. 154(b) by 0 days.

(21) Appl. No.: 13/023,828

(22) Filed: Feb. 9, 2011

(65) Prior Publication Data
US 2012/0202481 A1   Aug. 9, 2012

(51) Int. Cl.
*H04W 36/00* (2009.01)

(52) U.S. Cl.
USPC ........... 455/436; 455/437; 455/438; 455/439; 455/442; 455/443; 455/450; 370/331; 370/332; 370/333; 370/334

(58) Field of Classification Search .................. 455/436, 455/442, 443, 444, 446, 448, 552.1, 434, 455/160.1, 161.1, 435.2, 525, 437; 370/331, 370/395.3
See application file for complete search history.

(56) References Cited

U.S. PATENT DOCUMENTS

| 2005/0266845 | A1* | 12/2005 | Aerrabotu et al. | 455/436 |
|---|---|---|---|---|
| 2009/0011757 | A1* | 1/2009 | Tenny | 455/425 |
| 2011/0183676 | A1* | 7/2011 | Lee et al. | 455/438 |
| 2011/0244858 | A1* | 10/2011 | Callender | 455/436 |

FOREIGN PATENT DOCUMENTS

| EP | 2 453 692 A1 | 5/2012 |
|---|---|---|
| WO | WO 01/10161 A1 | 2/2001 |
| WO | WO 2011/160512 A1 | 12/2011 |
| WO | WO 2012/019994 A1 | 2/2012 |

OTHER PUBLICATIONS

"ANR Configuration and Reporting" [online] [retrieved Feb. 16, 2011]. Retrieved from the Internet: <http://www.3gpp.org/ftp/tsg_ran/WG2_RL2/TSGR2_71bis/Docs/R2-105725.zip>. 4 pages.
"Cell reselection ANR Open issues" [online] [retrieved Feb. 16, 2011]. Retrieved from the Internet: <http://www.3gpp.org/ftp/tsg_ran/WG2_RL2/TSGR2_72/Docs/R2-106484.zip>. 6 pages.
Combined Search and Examination Report for Great Britain Application No. GB1111266.1, mailed Jul. 21, 2011.
Examination Report for Great Britain Application No. 1111266.1, dated Mar. 12, 2012.

(Continued)

*Primary Examiner* — Justin Lee
(74) *Attorney, Agent, or Firm* — Lucas & Mercanti LLP; Robert P. Michal (57) ABSTRACT

A method, apparatus and computer program product are provided for supplying information regarding a neighbor cell following cell reselection in a manner that reduces the signaling load on the network and conserves battery consumption by a mobile terminal. In this regard, the method, apparatus and computer program product do not blindly provide information regarding a neighbor cell that the current cell has already collected, but, instead, first determines if the neighbor information regarding a prior cell is different than and therefore will add to the information regarding neighbor cells that is already maintained by the current cell. Only after making such a determination may a mobile terminal signal the current cell as to the availability of neighbor information regarding a prior cell.

18 Claims, 3 Drawing Sheets

OTHER PUBLICATIONS

Search Report for Great Britain Application No. 1208218.6, dated Jun. 12, 2012.

International Search Report and Written Opinion for International Application No. PCT/IB2012/050595, mailed Jun. 5, 2012.

Renesas Electronics Europe; "Logged ANR method considerations", 3GPP TSG-RAN WG2 Meeting #72bis; R2-110305; Agenda item: 10.5; Dublin Ireland; Jan. 17-21, 2011.

ZTE; "UMTS SON ANR Email Discussion Report on ANR open issues"; 3GPP TSG-RAN WG2 Meeting #72bis; R2-110084; Agenda item; 10.5.1; Dublin, Ireland; Jan. 17-21, 2010.

ZTE, China Unicom; "ANRF for UTRAN"; 3 GPP TSG RAN WG3 #69bis; R3-102739; Agenda item: 15.1.1; Xian China; Oct. 11-15, 2010.

Renesas Electronics Europe; "Indication of log availability for inter-RAT ANR"; 3GPP TSG-RAN WG2 Meeting #73; R2-111201; Agenda item: 10.5.2; Taipei, Taiwan; Feb. 21-25, 2011.

* cited by examiner

METHOD AND APPARATUS FOR INTELLIGENTLY REPORTING NEIGHBOR INFORMATION TO FACILITATE AUTOMATIC NEIGHBOR RELATIONS

TECHNOLOGICAL FIELD

Embodiments of the present invention relate generally to wireless communication technology and, more particularly, relate to an apparatus, method and computer program product for intelligently reporting neighbor information in support of automatic neighbor relations, such as during a cell reselection process.

BACKGROUND

The manual provision and management of neighbor cells in conventional mobile networks is challenging and has become even more so as additional radio access technologies (RATs) have been developed and implemented. With respect to the Long Term Evolution (LTE) protocol, for example, neighbor relations must generally be maintained not only for other LTE cells to support intra-RAT cell reselection, but also for neighboring cells that operate in accordance with other radio access technologies to support inter-RAT cell reselection.

In order to facilitate the provisioning and management of neighbor cells, automatic neighbor relations (ANR) functionality has been developed. The ANR functionality generally resides in a base station, such as an evolved node B (eNB) or the like. The ANR functionality of an eNB may maintain a listing of neighbor cells to facilitate handover or reselection thereto. For each neighbor cell, the neighbor list maintained by an eNB generally identifies the neighbor cells, such as a cell global identifier (CGI), an Evolved Universal Terrestrial Radio Access Network (E-UTRAN) cell global identifier (ECGI), a physical cell identifier (PCI) or the like.

In the context of a handover or cell reselection, the eNB may update the neighbor list with information regarding the prior cell. The information regarding the prior cell may be provided by the mobile terminal that was recently the subject of the handover or cell reselection since the mobile terminal was previously served by the prior cell and may therefore have neighbor information regarding the prior cell.

During cell relocation between cells of the same radio access technology, such as from one Universal Mobile Telecommunications System (UMTS) cell to another UMTS cell, the mobile terminal may be configured to log or store information regarding the prior cell or any other detected cells and to subsequently report the information regarding the prior cell or any other detected cells to the current cell at some subsequent point in time. However, in instances in which a mobile terminal reselects from a prior cell operating in accordance with one type of radio access technology to another cell operating in accordance with a different radio access technology, that is, an inter-RAT cell reselection, the mobile terminal may be configured to report the information regarding the prior cell to the current cell during or immediately following the reselection.

For example, the mobile terminal may perform reselection from a Global System for Mobile communications (GSM) Enhanced Data-rates for Global Evolution Radio Access Network (GERAN) or E-UTRAN cell to a UMTS cell. Prior to the reselection, the mobile terminal may have stored ANR information regarding the prior cell, such as the GERAN or EUTRAN cell, including, for example, frequency, PCI, CGI/cell ID, etc. During the cell reselection and registration process, the mobile terminal may provide an indication to the current cell, such as a UMTS cell, that signals that the mobile terminal has information, such as ANR information, regarding the prior cell. For example, the mobile terminal may transmit a Radio Resource Control (RRC) Connection Setup Complete message to the UMTS cell that includes a single bit that may be set to indicate that the mobile terminal has ANR information regarding the prior cell. The network, such as the UMTS cell, may then issue a message to the mobile terminal requesting the information, such as the ANR information, regarding the prior cell. For example, a UMTS cell may issue a User Equipment (UE) Information Request message to the mobile terminal soliciting the ANR information. The mobile terminal may then provide the information to the current cell, such as via a UE Information Response message, and the current cell may, in turn, update the neighbor list with the neighbor information regarding the prior cell.

BRIEF SUMMARY

A method, apparatus and computer program product are provided for supplying information regarding a neighbor cell following cell reselection in a manner that reduces the signaling load on the network and conserves battery consumption by a mobile terminal. In this regard, the method, apparatus and computer program product of an example embodiment do not blindly provide information regarding a neighbor cell that the current cell has already collected, but, instead, first determines if the neighbor information regarding a prior cell is different than and therefore will add to the information regarding neighbor cells that is already maintained by the current cell. Accordingly, the efficiency with which neighbor information regarding a prior cell is reported to a current cell during or following cell reselect may be improved by example embodiments of the present invention.

A method is provided in accordance with an example embodiment that includes receiving system information of a current cell following reselection from a prior cell, such as an inter-RAT reselection. The system information may include information regarding neighbor cells of the current cell, such as a neighbor cell list of the current cell or a listing of cells disallowed by the current cell. The method of this example embodiment also determines whether the information regarding neighbor cells of the current cell includes information regarding the prior cell. The method of this example embodiment then causes an indication that neighbor information regarding the prior cell is available to be communicated in an instance in which the information regarding neighbor cells of the current cell fails to include information regarding the prior cell, but not in an instance in which the information regarding neighbor cells of the current cell includes information regarding the prior cell. In one embodiment, the method may cause the indication that neighbor information regarding the prior cell is available to be communicated by causing an indicator to be included in a message communicated to the current cell during a setup process.

In another embodiment, an apparatus is provided that includes processing circuitry configured to at least receive system information of a current cell following reselection from a prior cell, such as an inter-RAT reselection. The system information may include information regarding neighbor cells of the current cell, such as a neighbor cell list of the current cell or a listing of cells disallowed by the current cell. The processing circuitry of this example embodiment may also be configured to determine whether the information regarding neighbor cells of the current cell includes information regarding the prior cell. The processing circuitry of this example embodiment may also be configured to then cause an indication that neighbor information regarding the prior cell is available to be communicated in an instance in which the information regarding neighbor cells of the current cell fails to include information regarding the prior cell, but not in an instance in which the information regarding neighbor cells of the current cell includes information regarding the prior cell. In one embodiment, the processing circuitry may be configured to cause the indication that neighbor information regarding the prior cell is available to be communicated by causing an indicator to be included in a message communicated to the current cell during a setup process.

In a further embodiment, a computer program product is provided that includes at least one computer-readable storage medium having computer-executable program code instructions stored therein. The computer-executable program code instructions may include code instructions for receiving system information of a current cell following reselection from a prior cell, such as an inter-RAT reselection. The system information may include information regarding neighbor cells of the current cell, such as a neighbor cell list of the current cell or a listing of cells disallowed by the current cell. The computer-executable program code instructions of this example embodiment may also include code instructions for determining whether the information regarding neighbor cells of the current cell includes information regarding the prior cell. The computer-executable program code instructions of this example embodiment may also include code instructions for then causing an indication that neighbor information regarding the prior cell is available to be communicated in an instance in which the information regarding neighbor cells of the current cell fails to include information regarding the prior cell, but not in an instance in which the information regarding neighbor cells of the current cell includes information regarding the prior cell. In one embodiment, the computer-executable program code instructions may also include code instructions for causing the indication that neighbor information regarding the prior cell is available to be communicated by causing an indicator to be included in a message communicated to the current cell during a setup process.

In a further embodiment, an apparatus is provided that includes means for receiving system information of a current cell following reselection from a prior cell, such as an inter-RAT reselection. The system information may include information regarding neighbor cells of the current cell, such as a neighbor cell list of the current cell or a listing of cells disallowed by the current cell. The apparatus of this example embodiment may also include means for determining whether the information regarding neighbor cells of the current cell includes information regarding the prior cell. The apparatus of this example embodiment may also include means for causing an indication that neighbor information regarding the prior cell is available to be communicated in an instance in which the information regarding neighbor cells of the current cell fails to include information regarding the prior cell, but not in an instance in which the information regarding neighbor cells of the current cell includes information regarding the prior cell. In one embodiment, the apparatus may also include means for causing the indication that neighbor information regarding the prior cell is available to be communicated by causing an indicator to be included in a message communicated to the current cell during a setup process.

BRIEF DESCRIPTION OF THE DRAWING(S)

Having thus described certain embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

As described above, a mobile terminal may be configured to provide an indication to the current cell during a cell reselection process that the mobile terminal has neighbor information regarding the prior cell that previously served the mobile terminal. The current cell and the mobile terminal may then exchange messages by which the neighbor information regarding the prior cell that was previously collected by the mobile terminal is provided to the current cell. In at least some instances, the neighbor information regarding the prior cell that is provided by the mobile terminal is duplicative of information regarding neighbor cells that the current cell already has on hand. In these instances, the signaling between the mobile terminal and the current cell whereby the mobile terminal indicates that it has neighbor information regarding the prior cell and the mobile terminal and the current cell then exchange messages by which the neighbor information regarding prior cell is provided to the current cell will have been unnecessary and will therefore have increased the network signaling load without any benefit. Additionally, the exchange of various messages regarding the neighbor information for the prior cell may disadvantageously consume battery power of the mobile terminal and therefore limit the battery life of the mobile terminal.

In accordance with some embodiments of the present invention, the method, apparatus and computer program product may limit the reporting of neighbor information regarding a prior cell during a cell reselection process, such as an inter-RAT cell reselection process in which the prior cell and the current cell operate in accordance with different radio access technologies. By limiting the reporting of the neighbor information regarding a prior cell during a cell reselection process so that neighbor information regarding the prior cell that is new or previously unknown to the current cell is reported, but transmission of neighbor information regarding the prior cell that is duplicative of information already maintained by the current cell is avoided, advantageously reduces the signaling load in the network and conserves battery resources for the mobile terminal.

Figure 1:
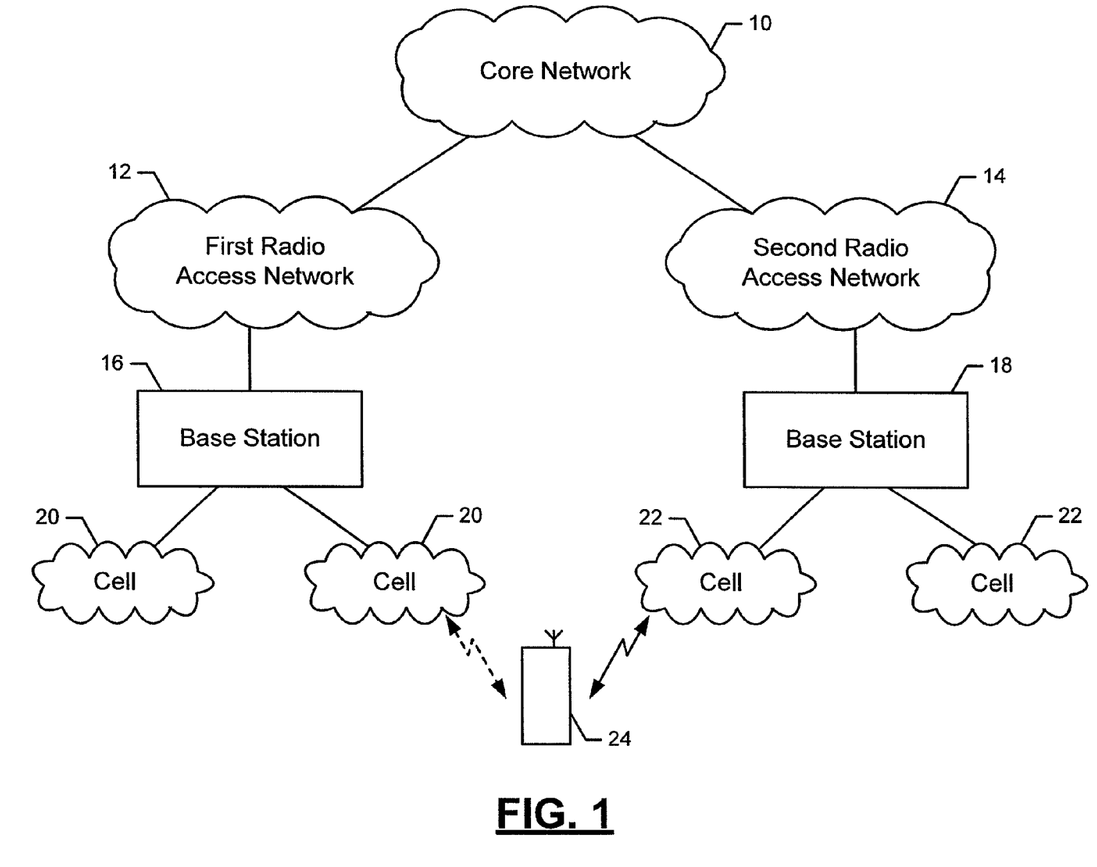
FIG. 1 illustrates an example of a communication system that supports cell relocation between cells operating in accordance with different radio access technologies.

The method, apparatus and computer program product of an example embodiment to the present invention may therefore facilitate the intelligent provision of neighbor information regarding a prior cell to a current cell in an instance in which a mobile terminal has undergone cell reselection from a prior cell to a current cell that operate in accordance with different radio access technologies. An example of such a heterogeneous communication system is shown in FIG. 1. A heterogeneous communication system may include one or more public land mobile networks (PLMNs) coupled to one or more other data or communication networks, such as a wide area network (WAN), e.g., the internet. As shown, each PLMN includes a core network 100, such as an evolved packet core (EPC), and each of the core networks and the internet are coupled to one or more radio access networks, air interfaces or the like that implement one or more radio access technologies. In the embodiment of FIG. 1, for example, a first radio access network 12 and a second radio access network 14 that operate in accordance with different wireless access technologies are illustrated. However, the heterogeneous communication system may include additional radio access networks operating in accordance with still different radio access technologies in other embodiments.

Each radio access network may include one or more base stations, e Node Bs (eNBs), access points or the like, which are generically referenced herein as base stations. With reference to the embodiment of FIG. 1, the first radio access network 12 is shown to include base station 16 and the second radio access network 14 is shown to include base station 18. Each base station may serve a coverage area divided into one or more cells. In this regard, base station 16 is shown to include two cells 20, while base station 18 is shown to serve two cells 22.

In addition, the communication system includes one or more mobile terminals 24. The mobile terminal may be embodied in various manners including as a mobile computer, a mobile telephone, a portable digital assistant (PDA), a pager, a mobile television, a gaming device, a laptop computer, a camera, a video recorder, an audio/video player, a radio, a global positioning system (GPS) device, any combination of the aforementioned or the like. In operation, a mobile terminal may be configured to connect to one or more of the radio access networks according to their particular radio access technologies to thereby access the particular core network of a PLMN, or to access one or more of the other data or communication networks, e.g., the internet. The mobile terminal may be configured to support multiple, that is, two or more, radio access networks operating in accordance with different radio access technologies so as to be configured to connect to multiple different radio access networks.

The radio access networks, such as the first and second radio access networks 12, 14, may be configured to operate in accordance with any radio access technology developed in accordance with second generation (2G), third generation (3G), fourth generation (4G) or higher generation mobile communication technology or their different versions, as well as any other wireless radio access technology. Examples of such radio access networks operating in accordance with different radio access technologies include GERAN, UTRAN including Long Term Evolution (LTE) and Long Term Evolution-Advanced (LTE-A) networks, E-UTRAN, code division multiple access (CDMA) networks including CDMA 2000 networks, and the like. In one example embodiment, the first radio access network may be a GERAN or E-UTRAN, while the second radio access network may be a UTRAN. Thus, the mobile terminal 24 of one embodiment may be configured to support UTRAN radio access technologies as well as either GERAN radio access technologies or E-UTRAN radio access technologies, or both.

Figure 2:
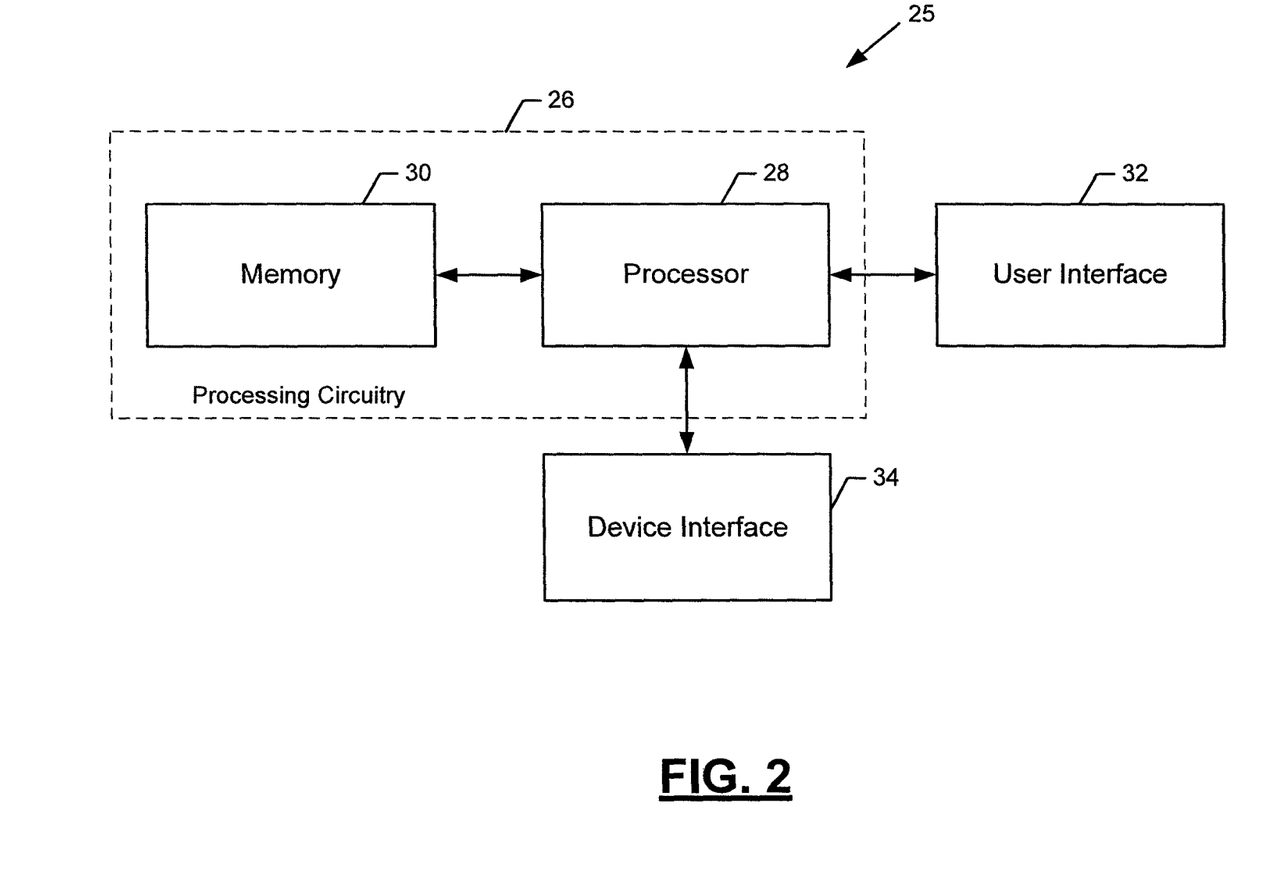
FIG. 2 illustrates a block diagram of an apparatus in accordance with an example embodiment to the present invention.

The mobile terminal 24 may be embodied as or otherwise include an apparatus 25 as represented by the block diagram of FIG. 2. In this regard, the apparatus may be configured to facilitate the intelligent provision of neighbor information regarding a prior cell to a current cell following cell reselection, such as an inter-RAT cell reselection. An example embodiment of the invention will be described hereinafter with reference to the apparatus of FIG. 2. The apparatus may be employed, for example, by a mobile terminal. However, it should be noted that the components, devices or elements described below may not be mandatory and thus some may be omitted in certain embodiments. Additionally, some embodiments may include further or different components, devices or elements beyond those shown and described herein.

As shown in FIG. 2, the apparatus 25 may include or otherwise be in communication with processing circuitry 26 that is configurable to perform actions in accordance with example embodiments described herein. The processing circuitry may be configured to perform data processing, application execution and/or other processing and management services according to an example embodiment of the present invention. In some embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 26 may include a processor 28 and memory 30 that may be in communication with or otherwise control a device interface 34 and, in some cases, a user interface 32. As such, the processing circuitry may be embodied as a circuit chip (e.g., an integrated circuit chip) configured (e.g., with hardware, software or a combination of hardware and software) to perform operations described herein. However, the processing circuitry may be embodied as a portion of a mobile computing device or other mobile terminal.

The user interface 32 may be in communication with the processing circuitry 26 to receive an indication of a user input at the user interface and/or to provide an audible, visual, mechanical or other output to the user. As such, the user interface may include, for example, a keyboard, a mouse, a joystick, a display, a touch screen, a microphone, a speaker, and/or other input/output mechanisms.

The device interface 34 may include one or more interface mechanisms for enabling communication with other devices and/or networks. In some cases, the device interface may be any means such as a device or circuitry embodied in either hardware, or a combination of hardware and software that is configured to receive and/or transmit data from/to a network and/or any other device or module in communication with the processing circuitry 26. In this regard, the device interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods.

In an example embodiment, the memory 30 may include one or more non-transitory memory devices such as, for example, volatile and/or non-volatile memory that may be either fixed or removable. The memory may be configured to store information, data, applications, instructions or the like for enabling the apparatus 25 to carry out various functions in accordance with example embodiments of the present invention. For example, the memory could be configured to buffer input data for processing by the processor 28. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 28 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 30 or otherwise accessible to the processor. As such, whether configured by hardware or by a combination of hardware and software, the processor may represent an entity, e.g., physically embodied in circuitry, capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

As noted above, the method, apparatus and computer program product of example embodiments of the present invention provide for the intelligent provision of neighbor information regarding a prior cell following cell reselection from the prior cell to a current cell that operate in accordance with different radio access technologies. By way of example, FIG. 1 illustrates a scenario in which a mobile terminal 24 was previously served by cell 20 in accordance with the radio access technology of the first radio access network 12. In this regard, the first radio access network may be a GERAN or E-UTRAN. While the mobile terminal was served by a cell of the first radio access network, the mobile terminal may receive and store information that identifies the cell and defines at least some of its operational characteristics including, for example, its frequency of operation, PCI, GCI/cell ID, etc. Thereafter a cell reselection process may occur such that the mobile terminal is subsequently served by a cell 22 of the second radio access network 14. In accordance with an example embodiment of the present invention, the second radio access network operates in accordance with a different radio access technology than the first radio access network. As such, in an instance in which the first radio access is a GERAN or E-UTRAN, the second access may be a UTRAN. As such, the cell reselection process is an inter-RAT reselection process.

During the cell reselection process, the second radio access network 14 may provide the mobile terminal 24 with system information to facilitate subsequent communications between the mobile terminal and the second radio access network, such as via base station 18 and cell 22. Included in this system information is information regarding neighbor cells of the current cell 22. The information regarding neighbor cells of the current cell may be provided in different forms. In this regard, the form of the information regarding neighbor cells that is provided by the second radio access network may be dependent upon the type of network that previously serviced the mobile terminal prior to cell reselection, such as the first radio access network 12 in the example of FIG. 2. For example, in an instance in which the first radio access network is a GERAN and the second radio access is a UTRAN, the system information provided by the second radio access network may include information that identifies the individual cells included in the neighbor list of the current cell. Alternatively, in an instance in which the first radio access network that previously serviced the mobile terminal is an E-UTRAN and the second radio access network is a UTRAN, the second radio access network may provide system information that includes a listing, that is, a black list, of the cells that are not allowed for purposes of handover, reselection or the like.

The mobile terminal 24 may then determine whether the information regarding the neighbor cells that is included in the system information provided by the current cell 22 includes the information that was previously collected and stored by the mobile terminal regarding the prior cell 20, such as the information identifying the prior cell and its operational characteristics, such as the frequency, PCI, CGI/cell ID, etc. associated with the prior cell. If the mobile terminal determines that the information regarding the neighbor cells that is included in the system information provided by the current cell already includes the information regarding the prior cell that the mobile terminal previously gathered and stored, the mobile terminal may be configured to not take any further action with respect to the neighbor information regarding the prior cell since the provision of such information to the current cell would be duplicative and wasteful of signaling and power resources for the network and the mobile terminal, respectively. For example, the mobile terminal may determine that the information regarding the neighbor cells that is included in the system information includes the neighbor information regarding the prior cell by the inclusion of the neighbor information regarding the prior cell in either a neighbor list or a black list that is provided by the current cell.

Alternatively, in an instance in which the information regarding the neighbor cells that is included in the system information does not include the neighbor information regarding the prior cell that was collected and stored by the mobile terminal 24, such as in an instance in which the neighbor information regarding the prior cell 20 is not included in a neighbor list or a black list provided by the current cell 22 in the system information, the mobile terminal may cause an indication to be transmitted to the current cell that indicates that neighbor information regarding the prior cell is available. Thereafter, the current cell may request the neighbor information regarding the prior cell and the mobile terminal may, in response to such a request, provide the neighbor information regarding the prior cell such that the current cell can supplement its information regarding neighbor cells with the neighbor information regarding the prior cell that was provided by the mobile terminal.

By only providing an indication that neighbor information regarding a prior cell 20 is available in an instance in which the information regarding neighbor cells that was included in the system information provided by the current cell 22 does not include the neighbor information regarding the prior cell, a mobile terminal 24 of an example embodiment of the present invention does not unnecessarily increase the signaling load on the network since network signaling will only occur in an instance in which the neighbor information regarding the prior cell will supplement the information regarding neighbor cells maintained by the current cell and not in an instance in which the neighbor information regarding the prior cell will be duplicative. Additionally, the battery consumption of the mobile terminal may be conserved since the mobile terminal does not expend the energy otherwise required to signal to the network the availability of the neighbor information regarding the prior cell in an instance in which the neighbor information regarding the prior cell will be duplicative of the information already maintained by the current cell.

The operations performed from the perspective of the mobile terminal 24 will now be described in conjunction with the flow chart of FIG. 3. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of an apparatus 25 employing an embodiment of the present invention and executed by a processor 38 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts block(s). These computer program instructions may also be stored in a non-transitory computer-readable storage memory 30 that may direct a computer or other programmable apparatus to function in a particular manner, such that the instructions stored in the computer-readable storage memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

Figure 3:
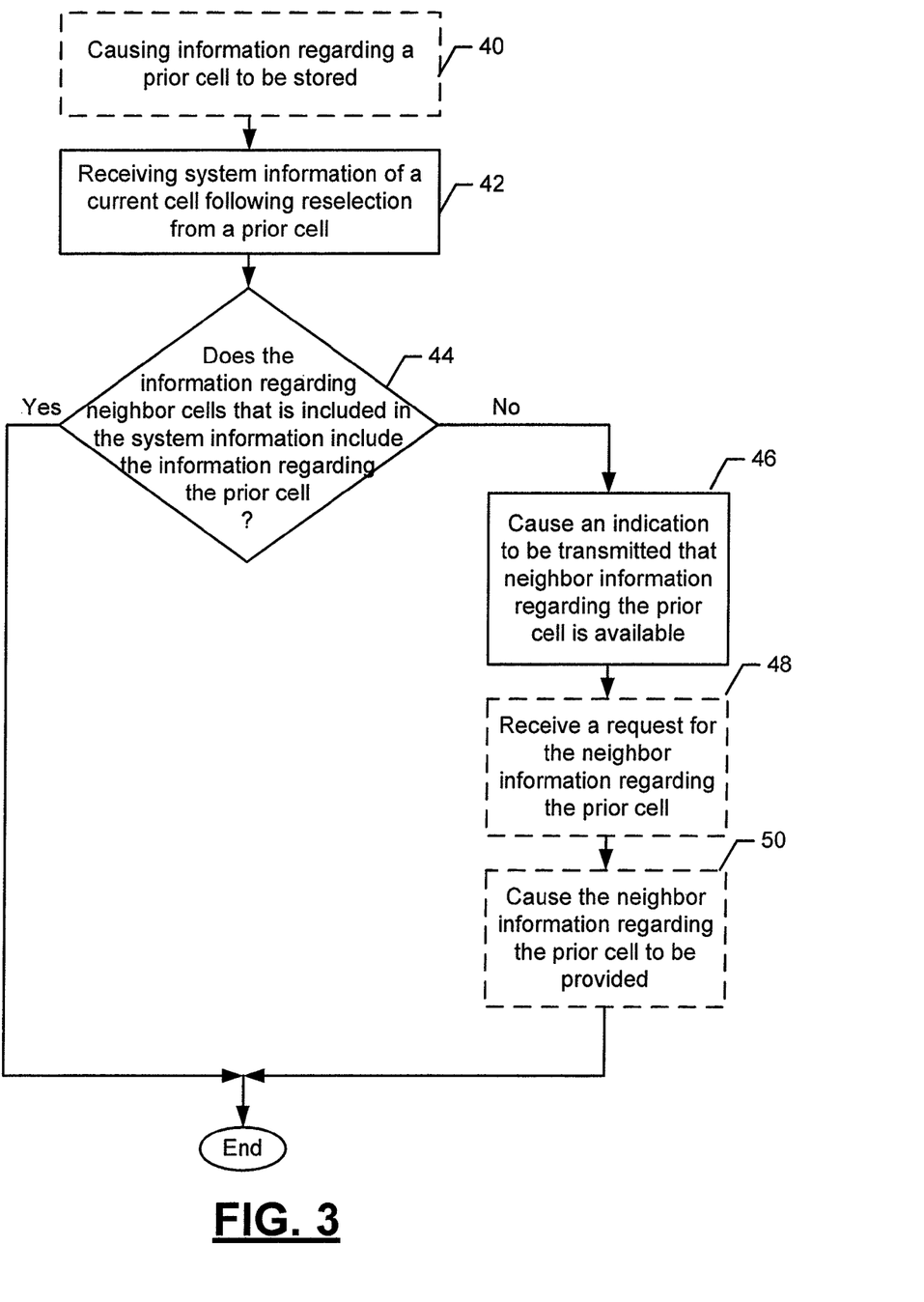
FIG. 3 is a flow chart illustrating operations performed in accordance with an example embodiment of the present invention.

Referring now to FIG. 3, the operations undertaken by the apparatus 25 in accordance with one embodiment of the present invention are illustrated. In this regard, the apparatus may include means, such as the processor 28, the processing circuitry 26, the memory 30 or the like, for causing information regarding a prior cell 20 to be stored. See block 40. For example, the information regarding the prior cell may identify the prior cell and at least some of its operational characteristics including, for example, frequency, PCI, CGI/cell ID, etc. This information regarding the prior cell may be stored prior to a cell reselection process, such as while the mobile terminal 24 is served by the prior cell. Thereafter, during or following cell reselection from the prior cell to a current cell 22 that is served by a different radio access network, such as a radio access network operating in accordance with a different radio access technology than that utilized by the radio access network that included the prior cell, the apparatus may include means, such as the device interface 34, the processor, the processing circuitry or the like, for receiving system information of the current cell. See block 42. Included in this system information is information regarding neighbor cells of the current cell. For example, the information regarding the neighbor cells of the current cell may include a neighbor cell list of the current cell or a listing of cells, that is a black list, that are disallowed by the current cell.

The apparatus 25 may also include means, such as the processor 28, the processing circuitry 26 or the like, for determining whether the information regarding the neighbor cells that is included in the system information includes the neighbor information regarding the prior cell 20 that was collected and stored by the mobile terminal 24. See block 44. In instances in which the apparatus determines that the information regarding the neighbor cells that is included in the system information provided by the current cell 22 does not include the neighbor information regarding the prior cell, the apparatus may include means, such as the processor, the processing circuitry, the device interface 34 or the like, for causing an indication to be transmitted to the current cell that indicates that the neighbor information regarding the prior cell is available. See block 46. Although the indication may be provided in various manners, the apparatus of one embodiment may include an indicator bit in the RRC Connection Setup Complete message that indicates the availability of neighbor information regarding the prior cell.

In response, the current cell 22 may provide and the apparatus 25 may include means, such as the device interface 34, the processor 28, the processing circuitry 26 or the like, for receiving a request for the neighbor information regarding the prior cell 20 from the current cell. See block 48. The apparatus may also include means, such as the device interface, the processor, the processing circuitry or the like, for thereafter causing the neighbor information regarding the prior cell to be provided to the current cell. See block 50. The current cell may then supplement the information maintained by the current cell regarding neighbor cells with at least some of the neighbor information regarding the prior cell provided by the mobile terminal. As shown in FIG. 3, however, in an instance in which the apparatus determines that the information regarding the neighbor cells that is included in the system information provided by the current cell does include the neighbor information regarding the prior cell that was previously collected and stored by the mobile terminal, the mobile terminal of one example embodiment does not take any further action with respect to the neighbor information regarding the prior cell. As such, the mobile terminal need not provide any indication of the availability of the neighbor information regarding the prior cell in this situation and, as a result, need not respond to a request from the current cell for the neighbor information regarding the prior cell by transmitting the neighbor information regarding the prior cell. Accordingly, both signaling load on the network and battery consumption for the mobile terminal may be reduced. Additionally, the efficiency of the ANR process during cell reselection, such as in the instance of an inter-RAT cell reselection, is correspondingly simplified and improved.

In some embodiments, the second radio access network 14 and, in turn, the current cell 22 may include an indication, such as in the system information, signaling to the mobile terminal 24 as to whether or not neighbor information regarding a prior cell 20 is ever be provided by the mobile terminal to the current cell. In an instance in which the second radio access network does indicate an interest in neighbor information regarding the prior cell, the mobile terminal may operate in accordance with the manner described above and as shown, for example, in FIG. 3. Alternatively, in an instance in which the second radio access network indicates that there is no interest in the neighbor information regarding the prior cell, the mobile terminal of this example embodiment need not determine whether the information regarding neighbor cells that is included in the system information provided by the current cell includes the neighbor information regarding the prior cell and, in any event, need not cause an indication to be transmitted to the current cell that the neighbor information regarding the prior cell is available even in an instance in which the information regarding neighbor cells that is included in the system information provided by the current cell fails to include the neighbor information regarding the prior cell since the second radio access network has previously provided an indication that it has no interest in such information.

In some embodiments, certain ones of the operations above may be modified or further amplified. For example, FIG. 3 illustrates, by dashed lines, additional optional operations that may be included in some embodiments, but not other embodiments. It should be appreciated that each of these optional operations may be included with the other operations either alone or in combination with any others among the features described herein.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   causing information regarding a prior cell to be stored prior to reselection from the prior cell to a current cell;
   receiving system information of the current cell following reselection from the prior cell, wherein the system information comprises information regarding neighbor cells of the current cell;
   determining, at an user apparatus that communicates with the prior cell and the current cell, whether the information regarding neighbor cells of the current cell includes information regarding the prior cell that was stored prior to reselection; and
   causing an indication that neighbor information regarding the prior cell is available to be communicated from the user apparatus to the current cell in an instance in which the information regarding neighbor cells of the current cell has been determined by the user apparatus to fail to include information regarding the prior cell that was stored prior to reselection, but not in an instance in which the format on regarding neighbor cells of the current cell includes information regarding the prior cell that was stored prior to reselection.

2. A method according to claim 1 wherein the information regarding neighbor cells of the current cell comprises a neighbor cell list of the current cell.

3. A method according to claim 1 wherein the information regarding neighbor cells of the current cell comprises a listing of cells that are disallowed by the current cell.

4. A method according to claim 1 wherein causing the indication comprises causing an indicator to be included in a message communicated from the user apparatus to the current cell during a setup process.

5. A method according to claim 1 wherein receiving the system information comprises receiving the system information of the current cell following reselection from the prior cell that operates in accordance with a different radio access technology than the current cell.

6. A new method according to claim 1 further comprising causing the neighbor information regarding the prior cell that was stored prior to reselection to be provided following communication of the indication that neighbor information regarding the prior cell is available.

7. An user apparatus comprising processing circuitry configured to at least:
   cause information regarding a prior cell to be stored prior to reselection from the prior cell to a current cell;
   receive system information of the current cell following reselection from the prior cell, wherein the system information comprises information regarding neighbor cells of the current cell;
   determine whether the information regarding neighbor cells of the current cell includes information regarding the prior cell that was stored prior to reselection; and
   cause an indication that neighbor information regarding the prior cell is available to be communicated from the user apparatus to the current cell in an instance in which the information regarding neighbor cells of the current cell has been determined by the user apparatus to fail to include information regarding the prior cell that was stored prior to reselection, but not in an instance in which the information regarding neighbor cells of the current cell includes information regarding the prior cell that was stored prior to reselection.

8. An user apparatus according to claim 7 wherein the information regarding neighbor cells of the current cell comprises a neighbor cell list of the current cell.

9. An user apparatus according to claim 7 wherein the information regarding neighbor cells of the current cell comprises a listing of cells that are disallowed by the current cell.

10. An user apparatus according to claim 7 wherein the processing circuitry being configured to cause the indication comprises the processing circuitry being configured to cause an indicator to be included in a message communicated from the apparatus to the current cell during a setup process.

11. An user apparatus according to claim 7 wherein the processing circuitry being configured to receive the system information comprises the processing circuitry being configured to receive the system information of the current cell following reselection from the prior cell that operates in accordance with a different radio access technology than the current cell.

12. An user apparatus according to claim 7 wherein the processing circuitry is further configured to cause the neighbor information regarding the prior cell that was stored prior to reselection to be provided following communication of the indication that neighbor information regarding the prior cell is available.

13. A computer program product resident at an user apparatus and comprising at least one non-transitory computer-readable storage medium having computer-executable program code instructions stored therein, the computer-executable program code instructions comprising program code instructions for:
  causing information regarding a prior cell to be stored prior to reselection from the prior cell to a current cell;
  receiving system information of the current cell following reselection from the prior cell, wherein the system information) comprises information regarding neighbor cells of the current cell;
  determining whether the information regarding neighbor cells of the current cell includes information regarding the prior cell that was stored prior to reselection; and
  causing an indication that neighbor information regarding the prior cell is available to be communicated from the user apparatus to the current cell in an instance in which the information regarding neighbor cells of the current cell has been determined by the user apparatus to fail to include information regarding the prior cell that was stored prior to reselection, but not in an instance in which the information regarding neighbor cells of the current cell includes information regarding the prior cell that was stored prior to reselection.

14. A computer program product according to claim 13 wherein the information regarding neighbor cells of the current cell comprises a neighbor cell list of the current cell.

15. A computer program product according to claim 13 wherein the information regarding neighbor cells of the current cell comprises a listing of cells that are disallowed by the current cell.

16. A computer program product according to claim 13 wherein the program code instructions for causing the indication comprise computer program instructions for causing an indicator to be included in a message communicated to the current cell during a setup process.

17. A computer program product according to claim 13 wherein the program code instructions for receiving the system information comprise program code instructions for receiving the system information of the current cell following reselection from the prior cell that operates in accordance with a different radio access technology than the current cell.

18. A computer program product according to claim 13 wherein the computer-executable program code instructions further comprise program code instructions for causing the neighbor information regarding the prior cell that was stored prior to reselection to be provided following communication of the indication that neighbor information regarding the prior cell is available.

* * * * *

UNITED STATES PATENT AND TRADEMARK OFFICE
CERTIFICATE OF CORRECTION

PATENT NO. : 8,433,321 B2
APPLICATION NO. : 13/023828
DATED : April 30, 2013
INVENTOR(S) : Brian Martin It is certified that error appears in the above-identified patent and that said Letters Patent is hereby corrected as shown below:

In the Claims:

On column 12, line 1, replace "format on" with --information--, in order to have claim 1 (column 11-12) read as follows:

--1. A method comprising:

causing information regarding a prior cell to be stored prior to reselection from the prior cell to a current cell;

receiving system information of the current cell following reselection from the prior cell, wherein the system information comprises information regarding neighbor cells of the current cell;

determining, at an apparatus that communicates with the prior cell and the current cell, whether the information regarding neighbor cells of the current cell includes information regarding the prior cell that was stored prior to reselection; and causing an indication that neighbor information regarding the prior cell is available to be communicated from the apparatus to the current cell in an instance in which the information regarding neighbor cells of the current cell has been determined by the apparatus to fail to include information regarding the prior cell that was stored prior to reselection, but not in an instance in which the information regarding neighbor cells of the current cell includes information regarding the prior cell that was stored prior to reselection.--.

Signed and Sealed this
Second Day of July, 2013

Teresa Stanek Rea
*Acting Director of the United States Patent and Trademark Office*